United States Patent
Lankes et al.

(10) Patent No.: US 7,451,845 B2
(45) Date of Patent: Nov. 18, 2008

(54) ADJUSTMENT OF THE SPEED OF A MOTOR VEHICLE WITH AN AUTOMATIC GEARBOX

(75) Inventors: Martin Lankes, Regensburg (DE); Stephan Pindl, Bad Abbach (DE)

(73) Assignee: Siemens Aktiengesellschaft, Munich (DE)

(*) Notice: Subject to any disclaimer, the term of this patent is extended or adjusted under 35 U.S.C. 154(b) by 2 days.

(21) Appl. No.: 11/276,514

(22) Filed: Mar. 3, 2006

(65) Prior Publication Data

US 2006/0131094 A1 Jun. 22, 2006

Related U.S. Application Data

(60) Division of application No. 10/793,060, filed on Mar. 4, 2004, now abandoned, which is a continuation of application No. PCT/DE02/03298, filed on Sep. 6, 2002.

(30) Foreign Application Priority Data

Sep. 6, 2001 (DE) ................. 101 43 735

(51) Int. Cl.
  *B60K 31/04* (2006.01)
  *F16H 59/00* (2006.01)
(52) U.S. Cl. ......................... 180/170; 701/53
(58) Field of Classification Search ............... 180/170, 180/171, 178, 179; 701/51, 52, 53, 93, 95, 701/96
See application file for complete search history.

(56) References Cited

U.S. PATENT DOCUMENTS

| | | | |
|---|---|---|---|
| 4,111,072 A * | 9/1978 | Harmon et al. ............. 477/125 |
| 4,660,672 A * | 4/1987 | Katou ........................ 180/175 |
| 5,099,429 A * | 3/1992 | Onari et al. ................. 701/103 |
| 5,166,881 A | 11/1992 | Akasu ......................... 701/96 |
| 5,680,309 A * | 10/1997 | Rauznitz et al. ............... 701/93 |
| 5,689,422 A * | 11/1997 | Heymann et al. ............. 701/93 |
| 5,954,617 A * | 9/1999 | Horgan et al. ............... 477/107 |
| 6,078,859 A * | 6/2000 | Jastrzebski et al. ........... 701/93 |
| 6,202,780 B1 * | 3/2001 | Tanaka et al. ............... 180/179 |
| 6,350,216 B1 | 2/2002 | Speicher et al. .............. 477/37 |
| 6,402,661 B2 | 6/2002 | Morita et al. ............... 477/108 |
| 6,718,247 B1 * | 4/2004 | Graf et al. .................... 701/51 |

FOREIGN PATENT DOCUMENTS

| | | |
|---|---|---|
| DE | 198 34 409 A1 | 2/1999 |
| DE | 19929693 A1 | 11/2000 |
| DE | 100 65 543 A1 | 8/2001 |
| EP | 1103742 A2 * | 5/2001 |
| JP | 06048216 | 2/1994 |

* cited by examiner

*Primary Examiner*—Frank B Vanaman
(74) *Attorney, Agent, or Firm*—Baker Botts L.L.P.

(57) ABSTRACT

A method relieves the burden of a driver of a motor vehicle in which the drive train is provided with a gearbox which can be operated in an automatic mode and a manual mode. The method comprises the following automatic steps: a) detection whether the speed of the vehicle should be adjusted, b) initiation of the adjustment if necessary, and c) the carrying out of the adjustment. During step b) and/or step c) it is determined on one or several occasions whether the gearbox is operating in an automatic mode or in a manual mode in order to trigger a change into the automatic mode of the gearbox if the gearbox is operated in the manual mode.

15 Claims, 4 Drawing Sheets

ADJUSTMENT OF THE SPEED OF A MOTOR VEHICLE WITH AN AUTOMATIC GEARBOX

CROSS REFERENCE TO RELATED APPLICATION

This application is a divisional of U.S. patent application Ser. No. 10/793,060 filed Mar. 4, 2004 now abandoned; which is a continuation of copending International Application No. PCT/DE02/03298 filed Sep. 6, 2002 which designates the United States, and claims priority to German application no. 101 43 735.8 filed Sep. 6, 2001; the contents of which are incorporated herein by reference in their entirety.

TECHNICAL FIELD OF THE INVENTION

The invention relates to a method for relieving the burden of a driver of a motor vehicle in which the drive train is provided with a gearbox that can be operated in an automatic mode and a manual mode. Such a method comprises the following automatic steps:
 a) detection whether the speed of the vehicle should be adjusted,
 b) initiation of the adjustment of the speed of the vehicle, if necessary, and
 c) carrying out the adjustment of the speed of the vehicle.

The invention also relates to a device for initiating and carrying out an automatic speed adjustment of a motor vehicle in which the drive train is provided with a gearbox that can be operated in an automatic mode and a manual mode.

DESCRIPTION OF THE RELATED ART

These kinds of methods and devices were developed with the objective target to relieve the burden of a driver of a motor vehicle from all the tasks by means of suitable auxiliary means and in this way to improve the overall ride comfort in which case these kinds of devices are generally referred to as "cruise control". The object of the cruise control device is to maintain the speed entered on the part of the driver. Relieving the burden of a driver is based on the fact that the driver to a large extent does not have to intervene to maintain a constant driving speed. The cruise control compensates by correspondingly engaging the drive train of the motor vehicle for influences affecting and changing the speed such as road inclination, frictional resistance, vehicle loading, etc. The efficiency of the cruise control particularly depends on the torque characteristics of the engine and/or additional drive sources (for example, additional electric motors, starter generators, etc.), the gearbox concept used (automatic or non-automatic gearbox), manual or automatic brake initiation and other auxiliary means that can for example be used to detect obstacles (distance) lying in the direction of travel and their state of movement.

In addition to maintaining the constant speed specified by the driver by means of suitable engine and/or gearbox engagement, several cruise controls offer a series of additional functions. For example, the driver in the case of some embodiments can specify a desired maximum speed. In this way, the cruise control limits the wheel moment by means of engine and/or gearbox engagements in such a way that the desired maximum speed is not exceeded. In addition, there already are solutions in which the driver can increase or reduce the desired set speed without having to actuate the accelerator pedal preferably within the specified limits by actuating the corresponding operating elements of the cruise control. For several embodiments, the cruise control can reduce the speed in a suitable way on detecting an obstacle, for example, a preceding motor vehicle for which an automatic brake initiation is carried out, if required, and thereafter the original set value is once again restored.

Cruise controls are very often offered together with automatic gearboxes because an engine engagement is often not enough to keep the desired speed constant, for example in the case of inclinations, and the desired speed can only be achieved by using a parallel change in the transmission ratio. Cruise controls are offered particularly to engines that can provide a relatively high torque, but they are also increasingly being offered to non-automatic gearboxes (standard manual gearboxes). Here, the desired speed can only be adjusted by changing the torque of the engine because an automatic gearbox engagement is not possible. This results in the fact that the effective range of the cruise control is more limited than in vehicles with automatic gearboxes. Should the desired speed for example be changed via the cruise control, the speeds corresponding to the engaged transmission ratio step are available as physical limits that result from the extreme speed values of the engine, i.e. from the idling and cutoff speed. Only the driver can adjust a desired speed lying outside this range by manually changing the transmission ratio.

In addition to automatic gearboxes and standard manual gearboxes, so-called automatic manual gearboxes are also used in the meantime. Such automatic manual gearboxes automate the standard manual gearboxes by automatically actuating the clutch and the gearbox. The automatic manual gearboxes can be operated both in a manual mode by the driver himself making decisions regarding the selection of the transmission ratio by manual engagements (by touching a plus/minus gearshift lever) or in an automatic mode where the transmission ratio is selected automatically, for example, by accessing logged switching characteristics, particularly together with driving strategy information.

From the literature DE 199 26 693 A1, a method for the manual transmission ratio specification of a continuously variable transmission of a motor vehicle is well-known. The gearbox can then be operated both in an automatic and in a manual operating mode. In the manual operating mode, a signal that is proportional to the speed of the motor vehicle is specified as the setpoint specification for the operating point guide of the manual gearbox unit.

SUMMARY OF THE INVENTION

The object of the invention is to further develop these kinds of methods and devices in such a way that their efficiency is amplified when compared to the state of the art explained above.

This object of the invention can be solved by a method for relieving the burden of a driver of a motor vehicle in which the drive train is provided with an automatic gearbox that can be operated in a manual mode and an automatic mode in which the transmission ratio is changed automatically comprising the following steps:
 a) detecting whether the speed of the vehicle should be adjusted,
 b) initiating of the adjustment of the speed of the vehicle, if necessary, and
 c) carrying out the adjustment of the speed of the vehicle,
 wherein on carrying out step b) and/or the step c), it is determined on one or several occasions whether the gearbox is operating in an automatic mode or in a manual mode in order to trigger a change into the automatic mode of the gearbox if the gearbox is operated in the manual mode.

On carrying out step b) and/or step c) it can be determined on one or several occasions whether changing the transmission ratio of the gearbox is advantageous and that a change into the automatic mode is only triggered if changing the transmission ratio of the gearbox is advantageous. Triggering the change into the automatic mode of the gearbox may take place by outputting a signal to the driver that he should manually change the gearbox into the automatic mode. Triggering the change into the automatic mode of the gearbox may also take place by activating a gearbox control and/or adjustment in such a way that it automatically carries out the change. When starting the execution of step b), the mode in which the gearbox is operated at the moment can be stored. After executing step c), operation of the gearbox in the stored mode can be ensured. Step c) may be terminated automatically if the driver has activated the manual mode of the gearbox. Step a) may include that it is monitored whether or not the driver more or less keeps or tries to keep the speed constant. Step b) and/or step c) may include the once only or repeated detection of a setpoint speed. On executing step c) by engaging the drive train and/or other components of the motor vehicle, the real speed of the motor vehicle may track the setpoint speed and for this an acceleration pattern may be used that is selected from several different acceleration patterns. The driver can select the used acceleration pattern. The used acceleration pattern can be selected on the basis of information gained during the distance covered by the driving operation. On executing step b), the distance to and/or the speed of possible obstacles can to be taken into consideration. The drive train may have several components that can output and/or record power and that the execution of step c) includes the effect on one or several of these components. Further, carrying out the adjustment of the speed of the vehicle (step c) may also comprise, wherein the drive train has several components that can output and/or receive power, managing the effect of output or received power on one or several of these components. The execution of step c) can take place on the basis of the wheel moment.

A motor vehicle may comprise a drive train, an automatic gearbox coupled with the drive train that can be operated in a manual mode and an automatic mode in which the transmission ratio is changed automatically, an automatic speed adjustment unit coupled with said gearbox, a control device coupled with said automatic gearbox and said automatic speed adjustment unit, wherein the control device comprises means to detect the activation of the automatic speed adjustment unit, and switching means to switch from the manual mode to the automatic mode of the automatic gearbox, wherein the switching means are controlled if the automatic speed adjustment is active and the automatic gearbox is in manual mode.

The control device may control the transmission ratio of the gearbox and determine during activation of the automatic speed adjustment unit whether a change of the transmission ratio is advantageous and that a change into the automatic mode is only triggered if changing the transmission ratio of the gearbox is advantageous. The control device can trigger the change into the automatic mode of the gearbox by outputting a signal to the driver that the gearbox in the automatic mode should be changed manually. The control device can trigger the change in the automatic mode of the gearbox by activating a gearbox control and/or adjustment in such a way that it automatically carries out the change. On initiating the automatic speed adjustment, the mode in which the gearbox can be operated at the moment is stored. On ending the automatic speed adjustment, the control unit may activate the gearbox control and/or adjustment in such a way that this ensures an operation of the gearbox in the stored mode. The control unit may end the automatic speed adjustment if the driver of the motor vehicle activates the manual mode of the gearbox. The control unit may initiate the automatic speed adjustment or offers to the driver of the motor vehicle the initiation of the automatic speed adjustment to more or less keep the speed constant should it be detected that the driver more or less keeps or tries to keep the speed constant. On initiating and/or carrying out the automatic speed adjustment, the control unit may detect the setpoint speed once only or repeatedly. The control unit can use an acceleration pattern to carry out the automatic speed adjustment that was selected from several different stored acceleration patterns. The driver of the motor vehicle can select the used acceleration pattern. The used acceleration pattern can be selected on the basis of information gained during the distance covered by the driving operation. On carrying out the automatic speed adjustment, the distance to and/or the speed of possible obstacles can be taken into consideration. The drive train may have several components that can output and/or record power and that on carrying out the automatic speed adjustment, it directly or indirectly has an effect on one or several of these components. Further, carrying out the adjustment of the speed of the vehicle may also comprise, wherein the drive train has several components that can output and/or receive power, managing the effect of output or received power on one or several of these components. Automatic speed adjustment can be carried out on the basis of the wheel moment.

The method according to the invention for relieving the burden of a driver of a motor vehicle is provided according to the state of the art because during step b) and/or the step c) it is determined on one or several occasions whether the gearbox is operating in an automatic mode or in a manual mode in order to trigger a change into the automatic mode of the gearbox if the gearbox is operated in the manual mode. The term "manual mode" means that the driver changes the gear by for example actuating a touch key (manual). However, the clutch need not be actuated to change the gear because these functions are taken over by the clutch or gearbox actuator. In contrast to this, all the gear changes are triggered automatically in the "automatic mode", i.e. engagement by the driver for example via the touch key is not necessary here. The solution according to the invention amplifies the efficiency when compared to the state of the art because after changing to the automatic mode, the initially mentioned physical limits for the reachable desired speed are no longer limited to the speeds corresponding to an engaged transmission ratio step. An optimized speed adjustment can be carried out in the automatic mode because in addition to the engine torque engagements it is also possible to select transmission ratio engagements.

An advantageous further development of the method according to the invention provides that during step b) and/or step c) it is determined on one or several occasions whether changing the transmission ratio of the gearbox is advantageous and that a change into the automatic mode is only triggered if changing the transmission ratio of the gearbox is advantageous. For example, it is feasible that the driver while traveling on the highway in the manual mode of the gearbox has already shifted to and engaged in the highest gear so that changing the transmission ratio within relatively high setpoint speed ranges is not advantageous. In this case, the gearbox can at least for the time being be operated further in the manual mode until there are considerable road inclinations.

In the case of specific embodiments of the method according to the invention it is provided that the change into the automatic mode of the gearbox is triggered by outputting a signal to the driver that the gearbox in the automatic mode should be changed manually or automatically. Signaling takes place by means of suitable signaling devices that can particularly be formed by optical and/or acoustic signaling devices.

Other embodiments of the method according to the invention provide that the change into the automatic mode of the gearbox is triggered by activating a gearbox control and/or adjustment in such a way that it automatically carries out the change. The automatic change can then either always or only then be carried out if it was determined that changing the transmission ratio of the gearbox is advantageous.

Furthermore, in the case of all embodiments of the method according to the invention it can be provided that when starting the execution of step b), the mode in which the gearbox is operated at the moment is stored.

In this context, an advantageous further development of the method according to the invention provides that after executing step c), operation of the gearbox in the stored mode is ensured. In this case after the execution of step c) the gearbox is changed in the manual mode if this mode was active before the activation of the speed adjustment whereas on the other hand the automatic mode is retained.

An advantageous further development of the method according to the invention provides that step c) ends automatically if the driver has activated the manual mode of the gearbox. This of course does not exclude the application of conventional exit conditions such as brake pedal actuation, accelerator pedal actuation, etc.

A preferred embodiment of the method according to the invention also provides that step a) includes that it is monitored whether or not the driver more or less keeps or tries to keep the speed constant. A constant speed may be monitored when the driver maintains the speed of the vehicle within a speed range for a predetermined time period. Provided that it was determined that the driver more or less keeps or tries to keep the speed constant, an optical and/or acoustic signal can for example be generated that offers a speed adjustment to the driver.

The method according to the invention preferably also provides that step b) and/or step c) includes the once only or repeated detection of a setpoint speed. For example, the current real speed can be taken over by actuating a key or such-like as the setpoint speed. However, the setpoint speed can also be detected independent of the real speed. If the driver, for example, provides a setpoint speed for a stationery motor vehicle, the vehicle can be accelerated to the envisaged speed after the brake control has automatically been released by suitable engagements in the engine and gearbox control or adjustment. For this, an automatic transition from the stationery vehicle via a pulling away process up to switching processes including engine engagements is provided.

A preferred further development of the method according to the invention provides that on executing step c) by engaging the drive train and/or other components of the motor vehicle, the real speed of the motor vehicle tracks the setpoint speed and that for this an acceleration pattern is used that is selected from several different acceleration patterns. The drive train can have more than one driving motor in the same way as all the embodiments of this invention. For example, an internal combustion engine can be provided with an associated starter generator in which case the latter can also be used to drive the motor vehicle. For example, it is feasible that for low setpoint speeds only an electric motor should be used for the drive. The other components of the vehicle can particularly include the braking system without being limited to it.

When converting from conventional acceleration processes without speed adjustment, the actuation of the accelerator pedal is usually evaluated. The accelerator pedal information, for example, the deflection of the accelerator pedal and/or the accelerator pedal gradient is then, on the part of the engine control and/or adjustment or when switching on the part of the gearbox control, converted to a corresponding desired engine torque. However, in the case of speed adjustment, i.e. acceleration to the setpoint speed, such accelerator pedal information is usually not available. In order to close this gap, several different acceleration patterns are provided in the preferred embodiment of the invention of which at least one is used to track the real speed. In a simple case, the different acceleration patterns can be formed by a slow, an average and a quick acceleration. It is also feasible that the acceleration patterns be further adapted to the motor vehicle load, the road inclination, road course, driver type, a wheel slip recognition, etc. Adjusting the desired acceleration pattern or the desired acceleration dynamics can also be carried out by adjusting a customary-implemented cruise control, for example, a PID control or the like in the cruise control.

In this context, the method according to the invention can provide that the driver can select the used acceleration pattern. It is, for example, possible that the driver under acceleration patterns for a slow, an average and a quick acceleration, selects the acceleration pattern to be used.

In addition or alternatively the method according to the invention can provide that the used acceleration pattern can be selected on the basis of information gained during the distance covered by the driving operation. It is already known that driver-specific variables, for example a sporty or comfort-accentuated ride must be determined and this information should for example be used for switching transition control. The same or similar information can be used for determining and/or selecting acceleration patterns.

An advantageous further development of the method according to the invention provides that on executing step b) the distance to and/or the speed of possible obstacles is to be taken into consideration. Obstacles can be both stationery obstacles and obstacles moving around on the road and/or on the edge of the road, for example around advancing vehicles. In order to face up to potential hazardous situations in a suitable manner, the speed adjustment also in this context preferably allows automatic brake initiations. The delay dynamics can for example be adapted to the current driving situation to guarantee a situation-equitable delay, i.e. for a great speed difference and a short distance to the obstacle ahead the delay dynamics should be high and, on the other hand, for a slight speed difference and long distance low.

An advantageous further development of the method according to the invention provides that the drive train has several components that can output and/or record power and that the execution of step c) includes managing the effect on one or several of these components. Depending on which components are in the drive train, for example, the internal combustion engine, starter generator, electric motor, gearbox and combinations from this, a central decision can be made which drive train components are used to reach and/or hold the setpoint speed. This allows an efficiency-optimized drive train control both with regard to the consumption and the comfort. As has already been mentioned above it is feasible that only one electric motor be used in the case of low desired speeds or setpoint speeds.

A preferred embodiment of the method according to the invention also provides that the execution of step c) takes place on the basis of the wheel moment. In this way, future developments concerning the drive train can also be taken into account and the drive train components can be set to the optimum. In addition to the automatic speed adjustment and acceleration pattern used for this, this preferably also applies to the conventional driving operation.

Each device that is suitable for carrying out an embodiment of the method according to the invention lies within the protective range of the associated claims.

The device according to the invention for initiating and carrying out an automatic speed adjustment of a motor vehicle is provided according to this kind of state of the art and is connected to a gearbox control and/or adjustment and provides that on initiating and/or carrying out the automatic speed adjustment it is determined on one or several occasions whether the gearbox is operating in an automatic mode or in a manual mode in order to trigger a change into the automatic mode of the gearbox if the gearbox is operated in the manual mode. As a result the advantages explained together with the method according to the invention follow in the same or in a similar way for which reason reference is made to the corresponding embodiments in order to prevent repetitions.

Accordingly, the same applies to the following preferred embodiments of the device according to the invention in which case reference is also made to the corresponding embodiments together with the method according to the invention with regard to the advantages that can be obtained with these embodiments.

Preferred embodiments of the device according to the invention provide that on initiating and/or carrying out the automatic speed adjustment it is determined on one or several occasions whether changing the transmission ratio of the gearbox is advantageous and that a change into the automatic mode is only triggered if changing the transmission ratio of the gearbox is advantageous.

Specific embodiments of the device according to the invention provide that it triggers the change into the automatic mode of the gearbox by outputting a signal to the driver that the gearbox in the automatic mode should be changed manually.

Other embodiments of the device according to the invention provide that it triggers the change into the automatic mode of the gearbox by activating a gearbox control and/or adjustment in such a way that it automatically carries out the change.

Preferred embodiments of the device according to the invention also provide that on initiating the automatic speed adjustment, the mode in which the gearbox is operated at the moment is stored.

Furthermore, in the same way as for the method according to the invention, a preferred embodiment of the device according to the invention is also provided in this context that on ending the automatic speed adjustment, it activates the gearbox control and/or adjustment in such a way that this ensures an operation of the gearbox in the stored mode.

Preferred embodiments of the device according to the invention provide that it ends the automatic speed adjustment if the driver of the motor vehicle activates the manual mode of the gearbox.

Furthermore, the device according to the invention can provide that it initiates the automatic speed adjustment or offers to the driver of the motor vehicle the initiation of the automatic speed adjustment to more or less keep the speed constant should it be detected that the driver more or less keeps or tries to keep the speed constant.

Also a preferred further development of the device according to the invention provides that on initiating and/or carrying out the automatic speed adjustment, it detects the setpoint speed once only or repeatedly.

Specially preferred embodiments of the device according to the invention provide that it uses an acceleration pattern to carry out the automatic speed adjustment that was selected from several different stored acceleration patterns.

In this context, the device according to the invention further provides that the driver of the vehicle can select the used acceleration pattern.

In addition or alternatively, in this context the device according to the invention can provide that the used acceleration pattern can be selected on the basis of information gained during the distance covered by the driving operation.

In the same way as for the method according to the invention, an advantageous further development of the device according to the invention provides that on carrying out the automatic speed adjustment, the distance to and/or the speed of possible obstacles is to be taken into consideration.

Furthermore, the device according to the invention provides that the drive train has several components that can output and/or record power and that on carrying out the automatic speed adjustment, it directly or indirectly manages an effect on one or several of these components.

The device according to the invention also deems it advantageous if it is provided that automatic speed adjustment is carried out on the basis of the wheel moment.

The invention is based on the knowledge that it is possible to use the synergies of cruise controls and automatic gearboxes with suitable connections. The invention can be used in all automatic gearboxes. In semi-automatic gearboxes at least some of the explained embodiments can be implemented.

BRIEF DESCRIPTION OF THE DRAWINGS

Preferred embodiments of the invention will emerge from the description which follows and from the accompanying drawings.

They are as follows.

DETAILED DESCRIPTION OF THE PREFERRED EMBODIMENTS

Figure 1:
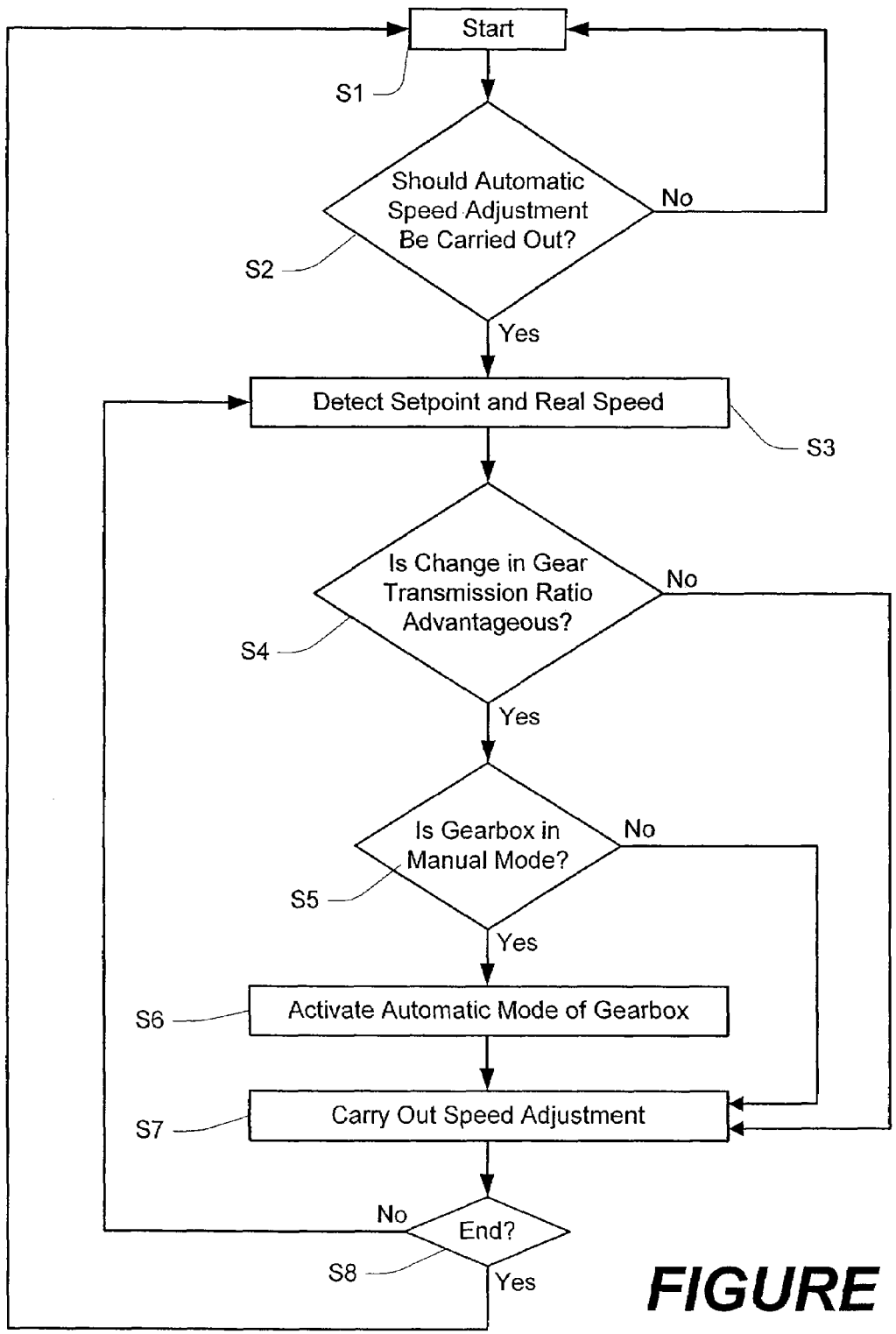
FIG. 1 a flow chart that illustrates a relatively simple embodiment of the method according to the invention, FIG. 2 a flow chart that illustrates an example of a speed adjustment on the basis of the wheel moment, FIG. 3 a block diagram that illustrates in a simplified way the cooperation of an embodiment of the device according to the invention with other components of a motor vehicle, and FIG. 4 two graphs illustrating the relation between the setpoint wheel moment curve and the speed.
Figure 2:
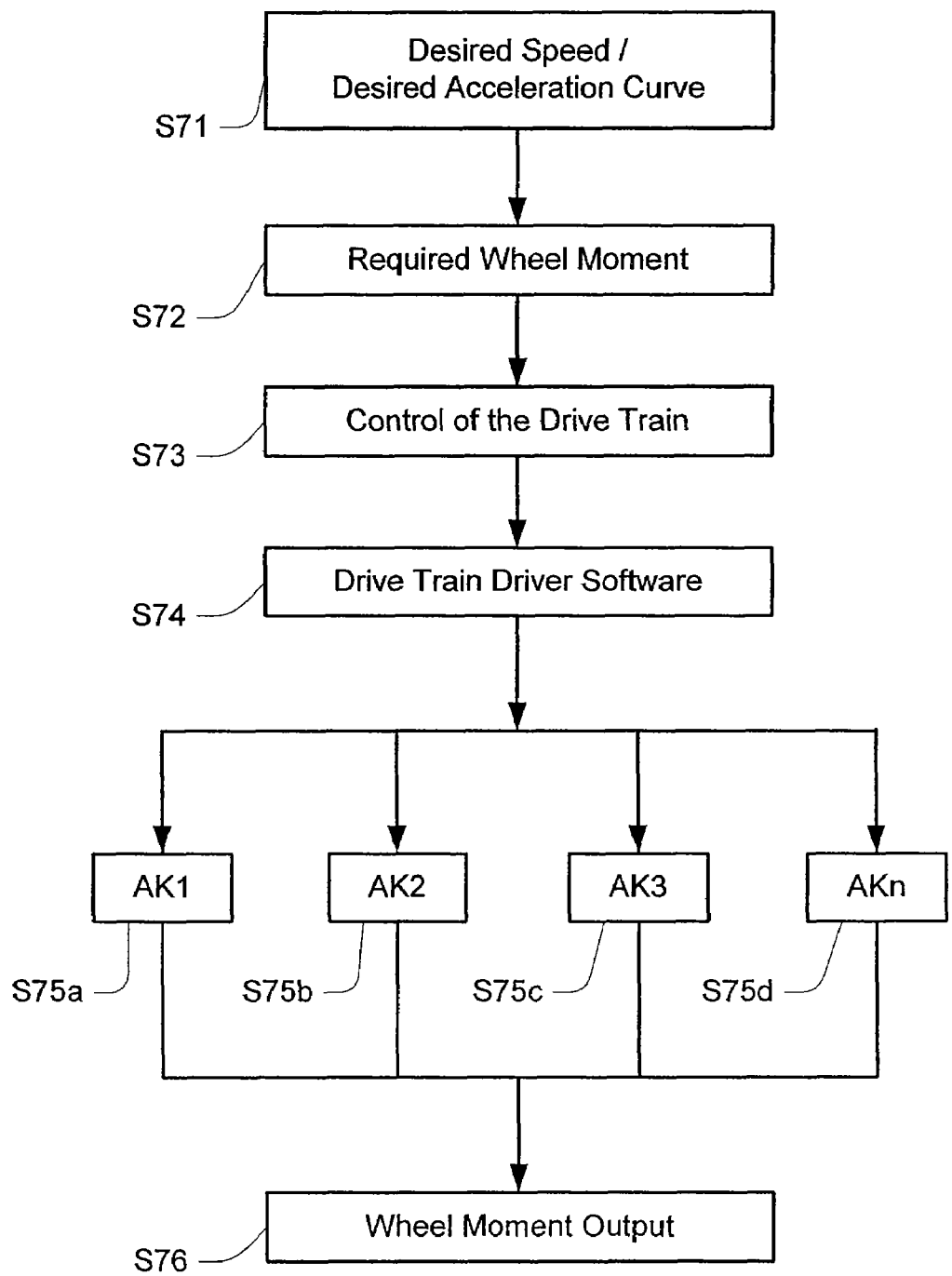

FIG. 1 is a flow chart that illustrates a relatively simple embodiment of the method according to the invention. The shown procedure starts with step S1. Step S2 detects whether or not an automatic adjustment of the speed of a motor vehicle should be carried out that corresponds to the procedural step a). To this effect, the operating elements of the device according to the invention or a cruise control are requested in a suitable way. In addition, it is also possible to this effect to monitor whether or not the driver of the motor vehicle more or less keeps the speed constant or tries to more or less keep the speed constant. Should this be the case, the driver can be requested to carry out the automatic speed adjustment in a suitable way. Provided that an automatic speed adjustment should not be carried out, branch back to step S1. Provided that it is determined in step S2 that an automatic speed adjustment should be carried out, branch to step S3. Step S3 detects the desired or setpoint speed and the real speed. The setpoint speed can be detected for example while the current real speed is taken over by actuating an operating element as the setpoint speed. In addition, it can also be provided in this context that the driver determines the setpoint speed independent of the current real speed in a suitable way. With regard to automatic motor vehicle control systems it is also feasible that external devices supply the setpoint speed. After the setpoint and real speed were detected in step S3, proceed to step S4. Step S4 checks whether or not a change in the gear transmission ratio is advantageous. To this effect, the real speed, the engine torque and the wheel moments as well as the current gear transmission ratio can for example be evaluated. Provided that it is determined in step S4 that a change in the gear transmission ratio is not advantageous, branch to S7 while the speed adjustment explained in greater detail in FIG. 2 is carried out later. If it is determined in step S4 that a change in the gear transmission ratio is advantageous, proceed to step S5. In step S5 a check is performed to determine whether or not the gearbox is operated in the manual mode or in the automatic mode. Provided that the gearbox is already operating in the automatic mode, branch to step S7 while the speed adjustment is carried out. If the gearbox is operated in the manual mode, proceed to step S6 in which the automatic mode of the gearbox is activated. For the embodiment of the method according to the invention shown in FIG. 1 it is assumed that the gearbox control or adjustment can automatically change the mode of the gearbox, i.e. without an engagement by the driver being necessary in this case. The above-mentioned steps S3 to S6 correspond to the procedural step b) in terms of the embodiment of the method according to the invention shown in FIG. 1. After the automatic mode of the gearbox was activated in step S6, proceed to step S7 in which the speed adjustment is carried out (procedural step c)) explained in greater detail in FIG. 2. In step S8 a check is performed to determine whether or not the speed adjustment should end. Ending the speed adjustment can be called up by means of different abort criteria, for example by actuating an operating element of the cruise control, actuating the brake pedal or also by external influences with regard to the automatic control method. Provided that the automatic speed adjustment should end, branch back to step S1. Otherwise, branch back to step S3 in which the setpoint and real speed are redetected. At least when step S3 is carried out again, it can be provided that the previous setpoint and real speed are taken over provided that no engagement by the driver is necessary in this case.

FIG. 2 is a flow chart that illustrates an example of a speed adjustment on the basis of the wheel moment. Carrying out the speed adjustment on the basis of the wheel moment is advantageous because as a result the method according to the invention (and also the device according to the invention) can be adapted in a relatively simple way to design changes of the drive train. Step S71 determines the desired speed and a desired acceleration curve. Therefore, the desired speed corresponds to the setpoint speed that was already detected in step S3 shown in the FIG. 1. For example, the desired acceleration curve can be selected from many different stored acceleration patterns. For example, the acceleration patterns can be specified non-varying and/or determined on the basis of information that was gained during the covered driving operation. Therefore, for example, a sporty or comfort-accentuated acceleration pattern adapted to the specific driver can be determined and/or selected. In step S72, the required wheel moment is calculated from the previously gained information. Subsequently, proceed to step S73 in which the control of the drive train is initiated. In the case of the embodiment shown in FIG. 2, the control of the drive train is carried out by a drive train driver software active in step S74 that in steps S75a to S75d acts on one or several drive train components AK1 to AKn in a suitable way. These drive train components AK1 to AKn can be, for example, an internal combustion engine and/or an electric motor (for example, as a starter generator) and/or the gearbox and/or other components that can record and/or output power. After one or several drive train components AK1 to AKn have been influenced or managed in a suitable way, the desired wheel moment is output in step S76.

Figure 3:
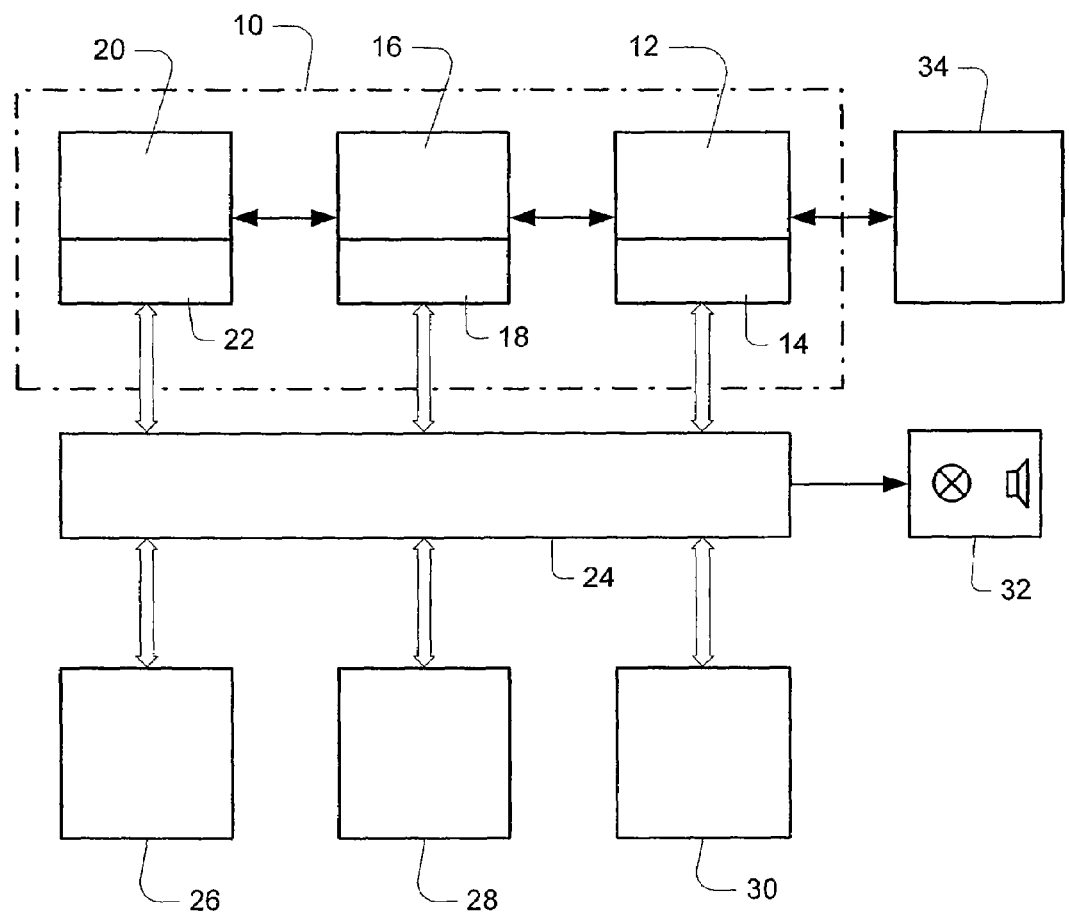

FIG. 3 is a block diagram that illustrates in a simplified way the cooperation of an embodiment of the device according to the invention with other components of a motor vehicle in which case the shown device is also suitable for carrying out the method according to the invention. The embodiment shown in FIG. 3 includes a drive train 10 and an internal combustion engine 20 to which internal combustion engine sensors and actuators 22 are allocated. A starter generator 16 is provided on the output shaft of the internal combustion engine 20 that is equipped with a starter generator control or adjustment 18. The output shaft of the internal combustion engine 20 is also connected to the gearbox 12 that can be operated both in the manual mode and the automatic mode. A gearbox control or adjustment 14 is allocated to the gearbox 12. The gearbox 12 is connected to at least one driving gear 34. In the case of the embodiment shown in FIG. 3, the device according to the invention is at least partially implemented in an engine control or adjustment designated with 24. The engine control 24 is also connected to the cruise control operating elements 26 which according to conventional means can consist of keys and/or levers and the like. Particularly in the case of embodiments in which the driver can explicitly give a setpoint speed independent of the real speed it is preferred to this effect that suitable input devices are provided that for example allow a keyboard and/or voice input. The engine control 24 is also connected to gearbox operating elements 28 that in the case of automatic manual gearboxes usually consist of at least two keys. For an automatic pedal-operated gearbox, the gearbox operating elements 28 must be adapted in a suitable way. FIG. 3 also shows an image processing unit 30 that is designed to detect possible obstacles or the distance to them and, if required, their speed so that hazardous situations can be avoided, particularly while the speed adjustment suitably adapts to the setpoint speed and with that to the real speed, if required, also via a brake initiation. In case the device according to the invention does not automatically initiate the gearbox 12 via the gearbox control 14 to change into the automatic mode should this be practical, a signaling device 32 is shown in FIG. 3. The signaling device 32 must then initiate the change of the gearbox 12 into the automatic mode while the signaling device 32 generates an optical and/or acoustic signal that outputs a signal to the driver that a manual change of the gearbox 12 into the automatic mode should be carried out via the gearbox operating elements 28.

Figure 4:
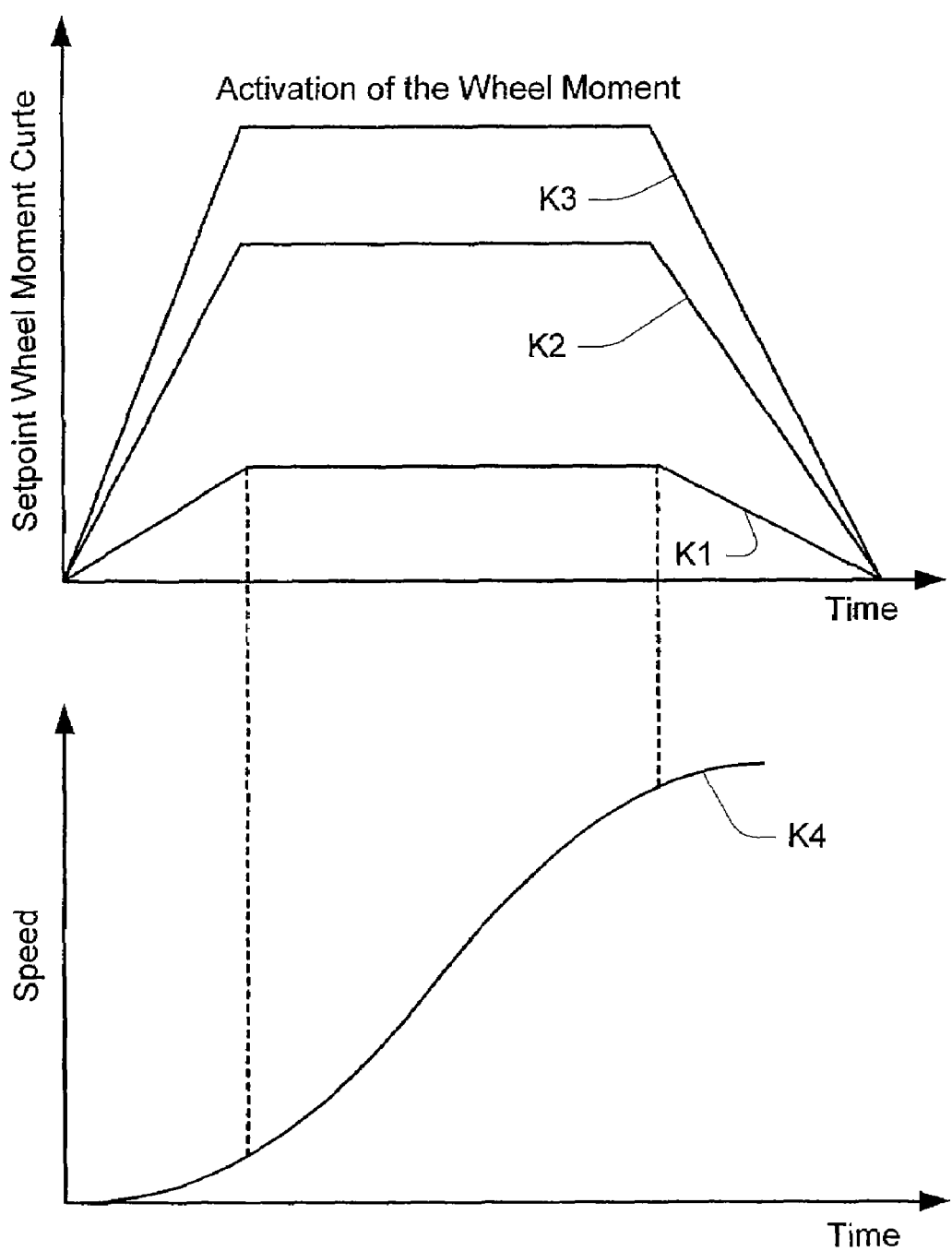

FIG. 4 shows two graphs that illustrate the connection between the setpoint wheel moment curve (top graph) and the speed (bottom graph). In this case, curve K1 illustrates an acceleration pattern with a low acceleration value, curve K2 an acceleration pattern with an average acceleration value and curve K3 an acceleration pattern with a high acceleration value. The acceleration value illustrated by curve K1 can be used for example to reach the setpoint speed if it was detected beforehand that the driver prefers a comfort-accentuated style of driving. The acceleration value illustrated by curve K3 can be used in a similar way if it was detected that the driver prefers a sporty style of driving. In the bottom part of FIG. 4, curve K4 illustrates the speed curve which follows if the acceleration pattern is used with the low acceleration value illustrated by curve K1 in order to reach the setpoint speed.

The features of the invention revealed in the above-mentioned description, the drawings and the claims can be of considerable importance both individually or in any combination for the embodiment of the invention.

We claim:

1. A method for relieving the burden of a driver of a motor vehicle in which the drive train is provided with an automatic gearbox that is operated in a manual mode and can be switched into an automatic mode in which the transmission ratio is changed automatically comprising the following steps:
   a) detecting whether the speed of the vehicle is maintained within a speed range for a predetermined time period;
   b) indicating a possible switch into an automatic mode for said gearbox, by outputting a signal to the driver that the driver confirm a change of the gearbox into the automatic mode;
   c) switching the gearbox into automatic mode after the driver has confirmed the switch;
   d) detecting whether the speed of the vehicle should be adjusted;
   e) initiating of the adjustment of the speed of the vehicle, if necessary; and
   f) carrying out the adjustment of the speed of the vehicle.

2. The method according to claim 1, wherein step c) is automatically performed after an evaluation of the gearbox ratio.

3. The method according to claim 1, wherein switching the gearbox into automatic mode and the driver confirming the switch takes place by the driver manually changing the gearbox into the automatic mode.

4. The method according to claim 1, wherein switching the gearbox into automatic mode takes place by activating a gearbox control and/or adjustment in such a way that it automatically carries out the change.

5. The method according to claim 1, wherein, when starting the execution of step e), the mode in which the gearbox is operated at the moment is stored.

6. The method according to claim 5, wherein, after executing step f), operation of the gearbox in the stored mode is ensured.

7. The method according to claim 1, wherein step f) is terminated automatically if the driver has activated the manual mode of the gearbox.

8. The method according to claim 1, wherein step d) includes that it is monitored whether or not the driver keeps the speed constant.

9. The method according to claim 1, wherein step e) and/or step f) includes the once only or repeated detection of a setpoint speed.

10. The method according to claim 9, wherein, on executing step f) by engaging the drive train and/or other components of the motor vehicle, the real speed of the motor vehicle tracks the setpoint speed and for this an acceleration pattern is selected from several different acceleration patterns.

11. The method according to claim 10, wherein the driver can select the acceleration pattern from the several different acceleration patterns.

12. The method according to claim 10, wherein a previous driving operation is evaluated and the acceleration pattern is selected on the basis of this evaluation.

13. The method according to claim 1, wherein, on executing step e), the distance to and/or the speed of obstacles is evaluated.

14. The method according to claim 1, wherein the drive train has several components that can output and/or receive power and that the execution of step f) includes managing the effect of output or received power on one or several of these components.

15. The method according to claim 1, wherein the execution of step f) takes place on the basis of the wheel moment.

* * * * *